(12) United States Patent
Xue et al.

(10) Patent No.: US 10,732,724 B2
(45) Date of Patent: Aug. 4, 2020

(54) GESTURE RECOGNITION METHOD AND APPARATUS (71) Applicant: HUAWEI TECHNOLOGIES CO., LTD., Shenzhen, Guangdong (CN)

(72) Inventors: Jiantao Xue, Beijing (CN); Anjian Li, Beijing (CN); Bin Su, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 9 days.

(21) Appl. No.: 15/958,380

(22) Filed: Apr. 20, 2018

(65) Prior Publication Data
US 2018/0239438 A1 Aug. 23, 2018

Related U.S. Application Data (63) Continuation of application No. PCT/CN2016/102603, filed on Oct. 19, 2016.

(30) Foreign Application Priority Data

Oct. 21, 2015 (CN) .......................... 2015 1 0694748

(51) Int. Cl.
G06F 3/01 (2006.01)
G06K 9/00 (2006.01)
(Continued)

(52) U.S. Cl.
CPC ................ G06F 3/017 (2013.01); G06F 3/01 (2013.01); G06F 3/04883 (2013.01);
(Continued)

(58) Field of Classification Search
CPC ........ G06F 3/017; G06F 3/01; G06F 3/04883; G06K 9/00335; G06K 9/00496; G06K 9/6256; H04L 5/0048; H04W 72/0453
See application file for complete search history.

(56) References Cited

U.S. PATENT DOCUMENTS 9,817,109 B2 * 11/2017 Saboo ..................... G01S 13/02
9,971,414 B2 * 5/2018 Gollakota ............... G06F 13/28
(Continued)

FOREIGN PATENT DOCUMENTS

CN 102053702 A 5/2011
CN 103294996 A 9/2013
(Continued)

OTHER PUBLICATIONS

International Search Report dated Dec. 30, 2016 in corresponding International Patent Application No. PCT/CN2016/102603.
(Continued)

Primary Examiner — Peter D McLoone
(74) Attorney, Agent, or Firm — Womble Bond Dickinson (US) LLP (57) ABSTRACT The method is applied to a terminal device, the terminal device stores training sample data, and the training sample data includes a correlation spectrum characteristic vector of a reflected signal of a sounding reference signal (SRS) and a corresponding user gesture identifier. The method includes: transmitting, by the terminal device, a first sounding reference signal (SRS); receiving, by the terminal device, a multipath reflected signal that is of the first sounding reference signal (SRS) and that is reflected from a gesture-making object, and performing a related operation on the reflected signal and a signal template corresponding to the first sounding reference signal (SRS), to obtain a correlation spectrum characteristic vector of the reflected signal; and matching, by the terminal device, the correlation spectrum characteristic vector of the reflected signal against the training sample data, to recognize an input gesture.

14 Claims, 6 Drawing Sheets (51) Int. Cl.
  *G06F 3/0488* (2013.01)
  *G06K 9/62* (2006.01)
  *H04L 5/00* (2006.01)
  *H04W 72/04* (2009.01)

(52) U.S. Cl.
  CPC ..... *G06K 9/00335* (2013.01); *G06K 9/00496* (2013.01); *G06K 9/6256* (2013.01); *H04L 5/0048* (2013.01); *H04W 72/0453* (2013.01)

(56) References Cited

U.S. PATENT DOCUMENTS

| | | |
|---|---|---|
| 2007/0195997 A1 | 8/2007 | Paul et al. |
| 2011/0156999 A1 | 6/2011 | Wu et al. |
| 2012/0252474 A1* | 10/2012 | Tiirola ................. H04L 5/0048 455/450 |
| 2014/0191955 A1 | 7/2014 | Raffa et al. |
| 2014/0380251 A1 | 12/2014 | Alameh et al. |
| 2015/0024763 A1* | 1/2015 | Lee ..................... H04W 72/082 455/450 |
| 2015/0185858 A1 | 7/2015 | Nagara |
| 2015/0261318 A1* | 9/2015 | Scavezze ............. G06F 3/0346 345/158 |
| 2016/0043842 A1* | 2/2016 | Gong ................... H04L 5/0048 370/329 |
| 2016/0054804 A1* | 2/2016 | Gollakata ............... G06F 3/017 345/156 |
| 2016/0252607 A1* | 9/2016 | Saboo .................. G01S 13/02 342/107 |
| 2016/0364006 A1 | 12/2016 | Zhang |
| 2017/0131395 A1* | 5/2017 | Reynolds ............... G01S 7/415 |
| 2017/0249503 A1* | 8/2017 | Guo .................. G06K 9/00335 |
| 2017/0277684 A1* | 9/2017 | Dharmarajan Mary .................... G06F 17/2836 |
| 2017/0358144 A1* | 12/2017 | Schwarz ................ G06F 3/013 |
| 2019/0053237 A1* | 2/2019 | Rico Alvarino ...... H04L 5/0048 |

FOREIGN PATENT DOCUMENTS

| | | |
|---|---|---|
| CN | 103529787 A | 1/2014 |
| CN | 104408395 A | 3/2015 |
| CN | 104615244 A | 5/2015 |
| CN | 104898844 A | 9/2015 |

OTHER PUBLICATIONS

Office Action, dated Dec. 21, 2018, in Chinese Application No. 201510694748.0 (5 pp.).

XP058058537 Chen Zhao et al., "SideSwipe: Detecting In-air Gestures Around Mobile Devices Using Actual GSM Signals," 27th Symposium on User Interface Software and Technology, Oct. 5-8, 2014, pp. 527-534.

XP033225894 Wenfeng HE et al., "WiG: WiFi-based Gesture Recognition System," 2015 24th International Conference on Computer Communication and Networks (ICCCN), dated Oct. 5, 2015, (7 pp.).

XP055000053 D. Astély et al., "LTE: The Evolution of Mobile Broadband," IEEE Communications Magazine, vol. 47, No. 4, dated Apr. 1, 2009, pp. 44-51.

XP055510127 Baolong Zhou et al., "Sounding Reference Signal Design for TDD LTE-Advanced System," 2012 IEEE Wireless Communications and Networking Conference (WCNC), Jun. 11, 2012, pp. 410-415.

Extended European Search Report, dated Oct. 5, 2018, in European Application No. 16856896.2 (9 pp.).

* cited by examiner

GESTURE RECOGNITION METHOD AND APPARATUS

CROSS-REFERENCE TO RELATED APPLICATIONS

This application is a continuation of International Application No. PCT/CN2016/102603, filed on Oct. 19, 2016, which claims priority to Chinese Patent Application No. 201510694748.0, filed on Oct. 21, 2015. The disclosures of the aforementioned applications are hereby incorporated by reference in their entireties.

TECHNICAL FIELD

This application relates to wireless communications technologies, and in particular, to a gesture recognition method and an apparatus.

BACKGROUND

With an increase in intelligent electronic devices and development of a man-machine interaction technology, a gesture recognition technology is applied to more intelligent electronic devices. A smartphone recognizes a gesture by means of gesture recognition input, to perform an operation such as making a phone call or enabling an application program. This can improve user experience.

In the prior art, relatively mature gesture recognition is using an image recognition technology to recognize an interaction command. In such an image-recognition-based method, a high-performance camera apparatus usually needs to be equipped. For example, a relatively typical application is an Xbox Kinect product of Microsoft. In this method, a still or dynamic image is obtained by using a camera device, then the image is analyzed by using a computer vision algorithm, and pattern matching is performed, so as to understand a meaning of such a gesture, and implement gesture recognition. However, in this technology, the high-performance camera apparatus is required, and a high-performance processor is required to perform a complex image analysis algorithm, resulting in high costs and difficulty in miniaturization. In addition, a to-be-recognized action needs to face the camera apparatus. Consequently, this technology cannot be widely applied due to the foregoing shortcomings.

Recently, Google releases a demonstration system of a smartwatch based on gesture recognition control. Without a need to touch a watch face, a user may control the smartwatch by using a finger movement and a gesture change as input. For example, the user may control a menu switch operation on the smartwatch by simulating a watch header remove action or a winding action near the smartwatch by using a finger. Google calls such a gesture operation interaction technology as "Project Soli" in which radar including radio detection and ranging radar is used to detect a gesture of the user and a slight action of a finger, and the gesture and the action are converted into information for input. The radar transmits a radio wave and collects reflective sensing of a hit target. For example, a user stimulates a winding action by rubbing an index finger with a thumb, and a system recognizes this gesture or action, and redirects the gesture to input the gesture to an application program. However, in this technology, a relatively expensive millimeter-level radar microchip is required to recognize a wireless receive signal change caused by a gesture change, so as to perform gesture recognition control, and therefore, costs are high. Consequently, only a high-end product can support such gesture recognition.

To sum up, in all existing gesture recognition technologies, a new high-cost component is required to be added to a device, resulting in high costs. A new gesture recognition method and technology is urgently required in the field, so as to reduce modification of hardware of user equipment to a minimum, and implement a gesture recognition function with low costs.

SUMMARY

Embodiments of the present invention provide a gesture recognition method and an apparatus, so as to implement a gesture recognition function with low costs without complexly modifying an existing terminal device.

According to a first aspect, a gesture recognition method is provided, and is applied to a terminal device for transmitting a mobile communications network signal, where the terminal device stores training sample data, and the training sample data includes a correlation spectrum characteristic vector of a reflected signal of a sounding reference signal (SRS) and a gesture identifier corresponding to the characteristic vector; and the method includes:

transmitting, by the terminal device, a first SRS;

receiving, by the terminal device, a multipath first reflected signal that is of the first SRS and that is reflected from a gesture-making object, and performing a related operation on the first reflected signal and a signal template corresponding to the first SRS, to obtain a correlation spectrum characteristic vector of the first reflected signal; and matching, by the terminal device, the correlation spectrum characteristic vector of the first reflected signal against the training sample data, to recognize a gesture input by the gesture-making object.

According to the first aspect, the terminal device does not need to be complexly modified, and other extra hardware does not need to be added to the terminal device. A reflected signal of an uplink sounding reference signal in the prior art is used for gesture recognition, and another communication function of the terminal device is not affected during gesture recognition, so that a gesture recognition function of the terminal device is implemented with low costs.

Optionally, with reference to the first aspect, in the method, the training sample data is pre-stored in the terminal device; or the training sample data is obtained from a network device by the terminal device.

Optionally, with reference to the first aspect, in the method, the terminal device transmits a second SRS;

the terminal device receives a multipath second reflected signal that is of the second SRS and that is reflected from the gesture-making object, and performs a related operation on the second reflected signal and a signal template corresponding to the second SRS, to obtain a correlation spectrum characteristic vector of the second reflected signal; and the terminal device uses the correlation spectrum characteristic vector of the second reflected signal and a gesture identifier corresponding to the characteristic vector as training sample data of the gesture input by the gesture-making object, and stores the training sample data in the terminal device.

According to the foregoing method in the first aspect, the reflected signal of the uplink sounding reference signal in the prior art is used to perform gesture training, and training sample data obtained by performing gesture training is stored, and can be used for a gesture recognition operation.

Optionally, with reference to the first aspect, in the method, the terminal device further uses the correlation spectrum characteristic vector of the second reflected signal and a corresponding user gesture identifier as the training sample data, and sends the training sample data to the network device.

Optionally, with reference to the first aspect, in the method, the related operation includes:

filtering out a reflected signal, where a distance between the reflected signal and the terminal device exceeds a specified distance when reflection occurs.

According to the foregoing method in the first aspect, after the reflected signal whose reflective distance exceeds the specified distance is filtered out, interference from an unrelated signal that is not reflected by the gesture can be reduced, thereby significantly increasing gesture recognition accuracy.

Optionally, with reference to the first aspect, in the method, the terminal device determines, according to an SRS set pre-stored in the terminal device, an SRS used for gesture recognition; or the terminal device receives information that is about an SRS set and that is sent by the network device; and the terminal device determines, according to the received information about the SRS set, an SRS used for gesture recognition.

Optionally, with reference to the first aspect, in the method, the SRS set includes a parameter value section corresponding to at least one SRS, and the parameter value section includes any one or more of the following: a transmit interval, a transmit bandwidth, a transmit carrier frequency, or a transmit power of the SRS; or the SRS set includes a parameter value corresponding to at least one SRS, and the parameter value belongs to a parameter value section.

Optionally, with reference to the first aspect, in the method, the parameter value section corresponding to the SRS includes any one or more of the following: the transmit interval is less than or equal to 10 milliseconds; the transmit bandwidth is greater than or equal to 100 MHz; the transmit carrier frequency is greater than or equal to 10 GHz; or the transmit power is less than or equal to 0 dBm.

According to a second aspect, a terminal device is provided, and is applied to a mobile communications system, where the terminal device includes a storage unit, a transmission unit, a receiving unit, and a processing unit, where the storage unit is configured to store a database, where the database stores training sample data, and the training sample data includes a correlation spectrum characteristic vector of a reflected signal of a sounding reference signal SRS and a gesture identifier corresponding to the characteristic vector;

the transmission unit is configured to transmit a first SRS that is determined by the processing unit and that is used for gesture recognition;

the receiving unit is configured to receive a multipath reflected signal that is of the first SRS and that is reflected from a gesture-making object; and the processing unit is configured to: determine the first SRS used for gesture recognition, and perform a related operation on the reflected signal received by the receiving unit and a signal template corresponding to the first SRS, to obtain a correlation spectrum characteristic vector of the first reflected signal; and match the correlation spectrum characteristic vector against the training sample data in the database, to recognize a gesture input by the gesture-making object.

According to the second aspect, the terminal device does not need to be complexly modified, and other extra hardware does not need to be added to the terminal device. A reflected signal of an uplink sounding reference signal in the prior art is used for gesture recognition, and another communication function of the terminal device is not affected during gesture recognition, so that a gesture recognition function of the terminal device is implemented with low costs.

Optionally, with reference to the second aspect, in the apparatus, the training sample data is pre-stored in the storage unit; or the training sample data is obtained from a network device by the terminal device by using the receiving unit, and is stored in the database of the storage unit.

Optionally, with reference to the second aspect, in the apparatus, the transmission unit is further configured to transmit a second SRS that is determined by the processing unit and that is used for gesture recognition;

the receiving unit is further configured to receive a multipath second reflected signal that is of the second SRS and that is reflected from the gesture-making object; and the processing unit is configured to: determine the second SRS used for gesture recognition, and perform a related operation on the second reflected signal received by the receiving unit and a signal template corresponding to the second SRS, to obtain a correlation spectrum characteristic vector of the second reflected signals; and use the correlation spectrum characteristic vector and a corresponding user gesture identifier as training sample data of the gesture input by the gesture-making object, and store the training sample data in the storage unit.

According to the foregoing apparatus in the second aspect, the reflected signal of the uplink sounding reference signal in the prior art is used to perform gesture training, and training sample data obtained by performing gesture training is stored, and can be used for a gesture recognition operation.

Optionally, with reference to the second aspect, in the apparatus, the transmission unit further uses the correlation spectrum characteristic vector of the second reflected signal and a corresponding user gesture identifier as the training sample data, and sends the training sample data to the network device.

Optionally, with reference to the second aspect, in the apparatus, that the processing unit performs a related operation includes:

filtering out a reflected signal, where a distance between the reflected signal and the terminal device exceeds a specified distance when reflection occurs.

According to the foregoing apparatus in the second aspect, after the reflected signal whose reflective distance exceeds the specified distance is filtered out, interference from an unrelated signal that is not reflected by the gesture can be reduced, thereby significantly increasing gesture recognition accuracy.

Optionally, with reference to the second aspect, in the apparatus, the storage unit pre-stores an SRS set; and the processing unit determines, according to the SRS set, an SRS used for gesture recognition; or the receiving unit receives information that is about an SRS set and that is sent by the network device; and the processing unit determines, according to the information that is about the SRS set and that is received by the receiving unit, an SRS used for gesture recognition.

Optionally, with reference to the second aspect, in the apparatus, the SRS set includes a parameter value section corresponding to at least one SRS, and the parameter value section includes any one or more of the following: a transmit interval, a transmit bandwidth, a transmit carrier frequency, or a transmit power of the SRS; or the SRS set includes a parameter value corresponding to at least one SRS, and the parameter value belongs to a parameter value section.

Optionally, with reference to the second aspect, in the apparatus, the parameter value section corresponding to the SRS includes any one or more of the following: the transmit interval is less than or equal to 10 milliseconds; the transmit bandwidth is greater than or equal to 100 MHz; the transmit carrier frequency is greater than or equal to 10 GHz; or the transmit power is less than or equal to 0 dBm.

According to a third aspect, a method for generating a sounding reference signal SRS used for gesture recognition is provided, where a network device generates an SRS set used for gesture recognition; and the network device sends information about the SRS set used for gesture recognition to a terminal device; where the SRS set includes a parameter value section corresponding to at least one SRS, and the parameter value section includes any one or more of the following: a transmit interval is less than or equal to 10 milliseconds; a transmit bandwidth is greater than or equal to 100 MHz; a transmit carrier frequency is greater than or equal to 10 GHz; or a transmit power is less than or equal to 0 dBm; or the SRS set includes a parameter value corresponding to at least one SRS, and the parameter value belongs to a parameter value section.

According to a fourth aspect, a network device is provided, and is applied to a mobile communications system, where the network device includes a transmission unit and a processing unit, where the processing unit generates an SRS set used for gesture recognition, and transmits information about the SRS set to the transmission unit; and the transmission unit is configured to transmit the information about the SRS set generated by the processing unit to a terminal device; where the SRS set includes a parameter value section corresponding to at least one SRS, and the parameter value section includes any one or more of the following: a transmit interval is less than or equal to 10 milliseconds; a transmit bandwidth is greater than or equal to 100 MHz; a transmit carrier frequency is greater than or equal to 10 GHz; or a transmit power is less than or equal to 0 dBm; or the SRS set includes a parameter value corresponding to at least one SRS, and the parameter value belongs to a parameter value section.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

A concept of a gesture recognition method disclosed in embodiments of this application is as follows: An uplink sounding reference (SRS) signal transmitted by a terminal device is reflected from a hand of a user or another gesture-making object to the terminal device, and the terminal device uses at least one of a power spectrum waveform of a reflected signal of the SRS, an arrival time of a reflected signal of the SRS, strength of a reflected signal of the SRS, a phase of a reflected signal of the SRS, or another measurement vector as a characteristic vector to perform gesture recognition.

Network elements in the embodiments of this application include a network device and a terminal device.

In an LTE system, an access network device is an eNB, and a core network device is an MME. In a UMTS system, an access network device is an RNC, and a core network device is an SGSN. In another wireless communications system, a corresponding access network device and a corresponding core network device are also included. In the embodiments of this application, both the access network device and the core network device are referred to as a network device relative to user equipment.

A person skilled in the art should understand that the terminal device in the embodiments of this application may be a device such as a user terminal, user equipment, or a mobile station.

Embodiment 1

An improvement to the prior art in Embodiment 1 of this application is mainly: a terminal device determines and transmits an SRS used for gesture recognition, receives a reflected signal that is of the SRS and that is for a user gesture, and processes the reflected signal; a database used for storing training sample data is provided on a terminal device side. Description is separately provided in the following.

In the wireless communications field, an SRS is mainly used for channel quality estimation, so that a base station can perform frequency selective scheduling for an uplink, including power control enhancement, selection of various initialization modulation and coding schemes of the terminal device, timing advance, and the like. The SRS sent by the terminal device is configured by using specified broadcast signaling of a network device. The terminal device configures the SRS according to an instruction of the network device, and sends the SRS at a designated location. Time-frequency resources, such as a transmit interval, a transmit bandwidth, a transmit carrier frequency, and a transmit power, occupied by the SRS are all configured by the network device.

In this embodiment of the present invention, a new gesture recognition function is assigned to the SRS. To recognize the user gesture by using the reflected signal of the SRS, the network device needs to configure, for the terminal device, an SRS set used for gesture recognition.

Before an SRS set configuration process is described, some information about the SRS in this embodiment of the present invention is described.

For a transmit interval of an SRS, a transmit interval of the SRS used for gesture recognition is less than that of a conventional SRS used for channel quality estimation. However, an excessively small transmit interval of the SRS leads to excessively frequent SRS transmission, and consequently, another communication signal is interfered with, and a big change is imposed on a computing capability of the terminal device. For example, in this embodiment of the present invention, the transmit interval of the SRS used for gesture recognition may be set to a value less than or equal to 10 milliseconds, and such a transmit frequency is enough to recognize the user gesture. For example, a specific value may be 5 milliseconds or 10 milliseconds.

For a transmit bandwidth and a carrier frequency of an SRS, both a transmit bandwidth and a carrier frequency of the SRS used for gesture recognition are greater than those of a conventional SRS used for channel quality estimation. For example, the transmit bandwidth of the SRS used for gesture recognition is set to a value greater than 100 MHz, so that the terminal device can determine a gesture within 30 cm. The carrier frequency of the SRS used for gesture recognition is set to a value greater than 10 GHz, so that the terminal device can determine a gesture change action within 1 cm.

For a transmit power of an SRS, the SRS used for gesture recognition acts only near the terminal device, and does not need to be transmitted to the network device. To reduce energy consumption and avoid interference to normal wireless communication, transmit power of the SRS used for gesture recognition needs to be reduced appropriately. For example, in the prior art, a transmit power of an SRS used for channel quality estimation is 23 dBm, and in this embodiment of this application, the transmit power of the SRS used for gesture recognition may be reduced to 0 dBm.

Figure 1:
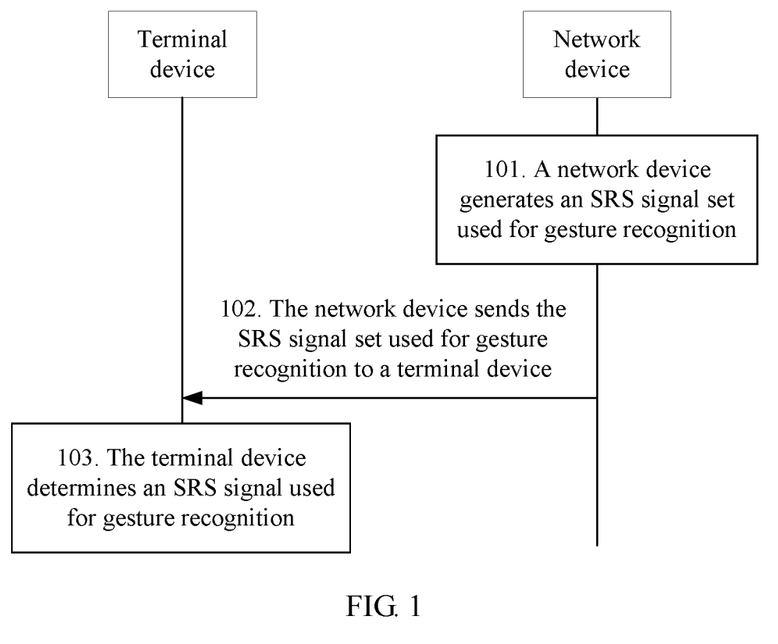
FIG. 1 is a flowchart of configuring an SRS set according to an embodiment of the present invention.

With reference to FIG. 1, the SRS set configuration process is described below.

Step 101: The network device generates an SRS set used for gesture recognition.

The SRS set includes a parameter value section corresponding to at least one SRS, and the parameter value section includes any one or more of the following: a transmit interval, a transmit bandwidth, a transmit carrier frequency, or a transmit power of the SRS. For example, as described above, the SRS set may be set as follows: The transmit interval is less than or equal to 10 milliseconds; the transmit bandwidth is greater than or equal to 100 MHz; the transmit carrier frequency is greater than or equal to 10 GHz; and the transmit power is less than or equal to 0 dBm. Correspondingly, according to the SRS set used for gesture recognition, the terminal device may determine that parameters corresponding to an SRS that needs to be currently transmitted are: a transmit interval is 5 milliseconds, a transmit bandwidth is 100 MHz, a transmit carrier frequency is 10 GHz, and a transmit power is 0 dBm; or may determine that a transmit interval is 10 milliseconds, a transmit bandwidth is 150 MHz, a transmit carrier frequency is 12 GHz, a transmit power is 0 dBm, or the like, provided that a requirement of the SRS set is met. Certainly, the signal set may further include parameter values corresponding to a group of specific SRSs. For example, the SRS set may be set as follows: For an SRS 1, a transmit interval is 5 milliseconds, a transmit bandwidth is 100 MHz, a transmit carrier frequency is 10 GHz, and a transmit power is 0 dBm; for an SRS 2, a transmit interval is 10 milliseconds, a transmit bandwidth is 150 MHz, a transmit carrier frequency is 12 GHz, and a transmit power is 0 dBm, provided that a requirement of the SRS set is met.

Step 102: The network device sends information about the SRS set used for gesture recognition to the terminal device.

Step 103: The terminal device receives the information about the SRS set, and determines, according to the information about the SRS set, an SRS currently used for gesture recognition.

When a user triggers a gesture input function, the terminal device selects an appropriate SRS from the SRS set used for gesture recognition, to perform transmission and recognition. When a parameter value section of an SRS is specified in the SRS set used for gesture recognition, the terminal device generates an SRS that meets a constraint condition of the parameter value section. When parameter values corresponding to a group of specific SRSs are specified in the SRS set used for gesture recognition, the terminal device selects an SRS from the group of specific SRSs. A qualified SRS may be selected according to a specific application environment and a requirement.

In actual application, the terminal device may store the SRS set used for gesture recognition. In this case, the SRS set configuration process may be omitted, and the terminal device does not need to require the network device to generate and configure the SRS set. When the terminal device needs to perform gesture recognition, the terminal device directly selects an SRS from the stored SRS set used for gesture recognition, to perform transmission.

In this embodiment of this application, the terminal device may first undergo a training stage, record a graph spectrum characteristic vector of a reflected signal of an SRS from a gesture of the user, use the graph spectrum characteristic vector as training sample data, and store the training sample data in a database.

Figure 2:
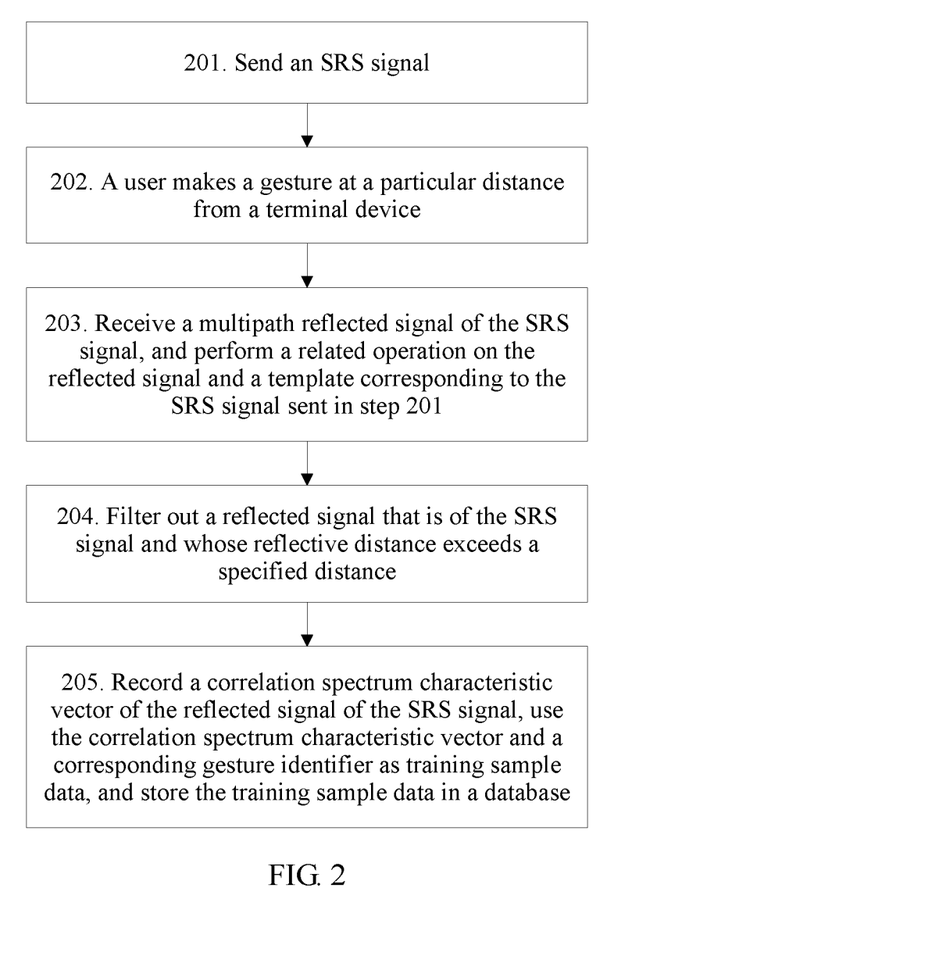
FIG. 2 is a training flowchart of a gesture recognition method according to an embodiment of the present invention.

With reference to FIG. 2, a training process is described below.

Step 201: The terminal device transmits an SRS.

For the SRS sent by the terminal device, if an SRS set configuration process of the network device is included, the terminal device selects the SRS from an SRS set sent by the network device; or if an SRS set configuration process of the network device is not included, the terminal device selects the SRS from an SRS set that is stored in the terminal device and that is used for gesture recognition. A specific manner of selecting an SRS is similar to that in step 103, and details are not described again.

Step 202: A user makes a gesture at a particular distance from the terminal device.

The user may make the gesture near the terminal device, for example, within 30 cm. In addition, a gesture described in each embodiment of this application is not limited to a gesture made by a hand of the user, and may be a gesture made by the user by using another object, or may be a gesture made by an animal.

Step 203: The terminal device receives a multipath reflected signal of the SRS transmitted in step 201, and performs a related operation on the reflected signal and a signal template corresponding to the SRS transmitted in step 201.

In this embodiment of this application, after sending the SRS in an uplink in step 201, the terminal device needs to immediately detect the reflected signal of the SRS at a same frequency, and this cannot be implemented by a prior-art terminal device. The prior-art terminal device detects only a downlink of a base station, and does not detect an uplink of the terminal device or another terminal device. Therefore, a full duplex technology is required to reduce or eliminate impact of the SRS sent by the terminal device on detection of the reflected signal of the SRS, so that the reflected signal of the SRS can be prevented from being flooded by the signal sent by the terminal device. For example, the terminal device may subtract a transmit signal from a receive signal, so as to eliminate impact exerted by the transmit signal on the receive signal at the same time on a same channel.

The terminal device may use a related local method to eliminate the impact exerted by the transmit signal on the receive signal. A correlation spectrum is obtained by performing the related operation on the received multipath reflected signal of the SRS and the signal template corresponding to the transmitted SRS, and a correlation spectrum characteristic vector of the reflected signal may be obtained by using the correlation spectrum, including a phase, a power, and a delay of a reflected signal of the SRS in each reflective path. The signal template corresponding to the transmitted SRS may be the transmitted SRS. The power and the delay reflect information such as a size of a reflector and a distance, and the terminal device may use the information to recognize different gestures, and in particular, a still gesture. According to the Doppler effect, a phase change reflects a moving speed and a moving direction of the reflector, so that the terminal device can use the phase change to recognize different gestures, and in particular, a move gesture.

Step 204: Filter out a reflected signal that is of the SRS and whose reflective distance exceeds a specified distance.

In step 203, the terminal device performs the related operation on the received multipath reflected signal of the SRS and the signal template corresponding to the transmitted SRS, to obtain an arrival time of a reflected signal of the SRS in each path by means of calculation. Therefore, when an SRS is reflected, a distance between the SRS and the terminal device can be obtained by means of calculation. In step 204, the terminal device may filter out a reflected signal that is of the SRS and that is relatively far away from the terminal device when the reflection occurs. The reflected signal that is of the SRS and that is filtered out is relatively far when the reflection occurs, and it is quite likely that the reflected signal is not an SRS reflected by the hand of the user. Therefore, filtering can reduce interference from an unrelated signal, and significantly increase gesture recognition accuracy. For example, a reflected signal of the SRS beyond 30 cm may be filtered out. Step 204 is an optional step, and may be omitted in actual application.

Step 205: Record a correlation spectrum characteristic vector of a reflected signal that is of the SRS and that is obtained after the filtering, use the correlation spectrum characteristic vector and a corresponding user gesture identifier as training sample data, and store the training sample data in a database.

Figure 3:
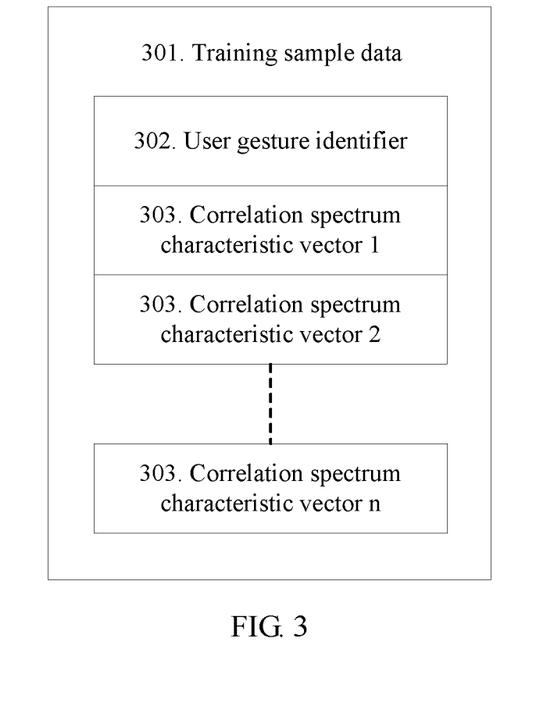
FIG. 3 is a schematic structural diagram of training sample data according to an embodiment of the present invention.

As shown in FIG. 3, training sample data 301 includes a correlation spectrum characteristic vector 303 and a user gesture identifier 302 corresponding to the correlation spectrum characteristic vector. A same gesture has only one piece of training sample data, but the training sample data of the gesture may have multiple correlation spectrum characteristic vectors, and the multiple correlation spectrum characteristic vectors may be obtained by repeatedly performing steps 201 to 206. Optionally, algorithm processing such as weighted averaging may be performed on the multiple correlation spectrum characteristic vectors. More correlation spectrum characteristic vectors indicate higher accuracy at a subsequent gesture recognition stage. The database may store multiple pieces of training sample data in FIG. 3 that are respectively corresponding to multiple user gestures.

A storage location of the database may be a non-volatile memory in the terminal device, or may be a non-volatile memory in the network device. If the database is stored in the network device, the terminal device needs to transmit the training sample data to the network device by using a communications link supported by the terminal device.

In addition, regardless of whether the database that stores the training sample data is located in the terminal device or the network device, the training sample data may be shared by all terminal devices, and the training sample data may be further processed in a big data analysis manner, so as to improve recognition accuracy.

In this embodiment of this application, after the terminal device undergoes the training stage, the database includes training sample data of each gesture; or training sample data of each gesture is obtained from the database of the network device in a sharing manner; or the training sample data may be pre-stored in the database of the terminal device. At the gesture recognition stage, the terminal device compares a correlation spectrum characteristic vector of a user gesture with the correlation spectrum characteristic vector in the training sample data in the database, so as to recognize the user gesture.

Figure 4:
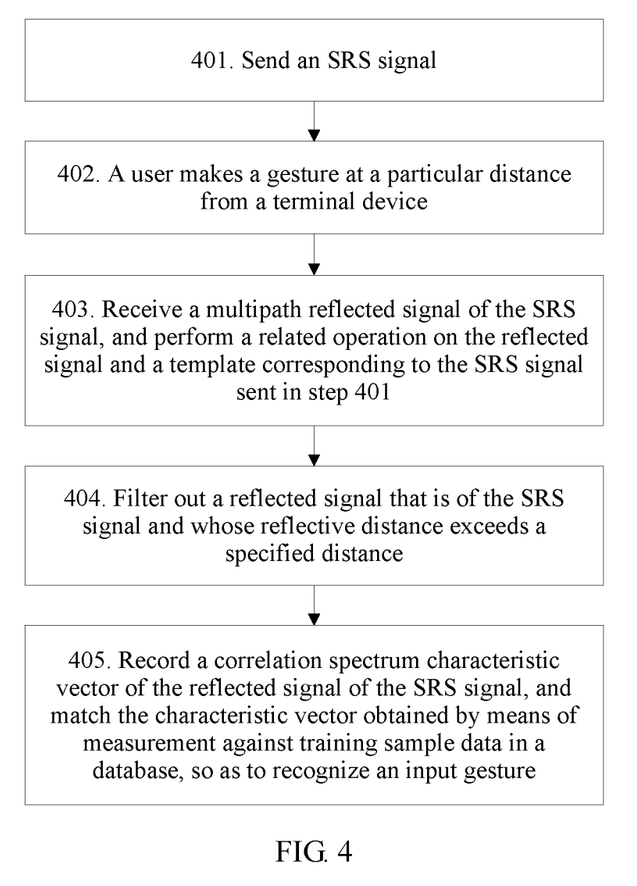
FIG. 4 is a flowchart of a gesture recognition method according to an embodiment of the present invention.

With reference to FIG. 4, a recognition process is described below.

Step 401: The same as step 201 at the training stage, the terminal device transmits an SRS.

Step 402: The same as step 202 at the training stage, a user makes a gesture at a particular distance from the terminal device.

Step 403: The same as step 203 at the training stage, the terminal device receives a multipath reflected signal of the SRS transmitted in step 401, and performs a related operation on the reflected signal and a signal template corresponding to the SRS sent in step 401.

Step 404: The same as step 204 at the training stage, filter out a reflected signal that is of the SRS and whose reflective distance exceeds a specified distance.

Step 405: Record a correlation spectrum characteristic vector of a reflected signal that is of the SRS and that is obtained after the filtering, and match the characteristic vector obtained by means of measurement against training sample data in a database, so as to recognize an input gesture.

Actually, a gesture may be determined with reference to all of a reflected signal arrival time, a reflective power, a reflected signal phase change, and a quantity of reflected signal paths, and impact exerted by an environment on gesture recognition is eliminated.

Because the database stores training sample data of each gesture, the terminal device compares a currently recorded correlation spectrum characteristic vector with a correlation spectrum characteristic vector in the training sample data of each gesture in the database, to search for training sample data closest to the current correlation spectrum characteristic vector, and then determine whether the closet training sample data is corresponding to a type of a current user gesture. For a method for searching for closest training sample data, determining may be performed by using an accumulated value of differences between all characteristic vectors, and a smallest accumulated value of differences is corresponding to closest training sample data. If the accumulated value of differences is less than a specified threshold, a user gesture type corresponding to the training sample data is a currently recognized user gesture. Certainly, another mathematical algorithm may be used for determining, and details are not described herein.

Figure 5:
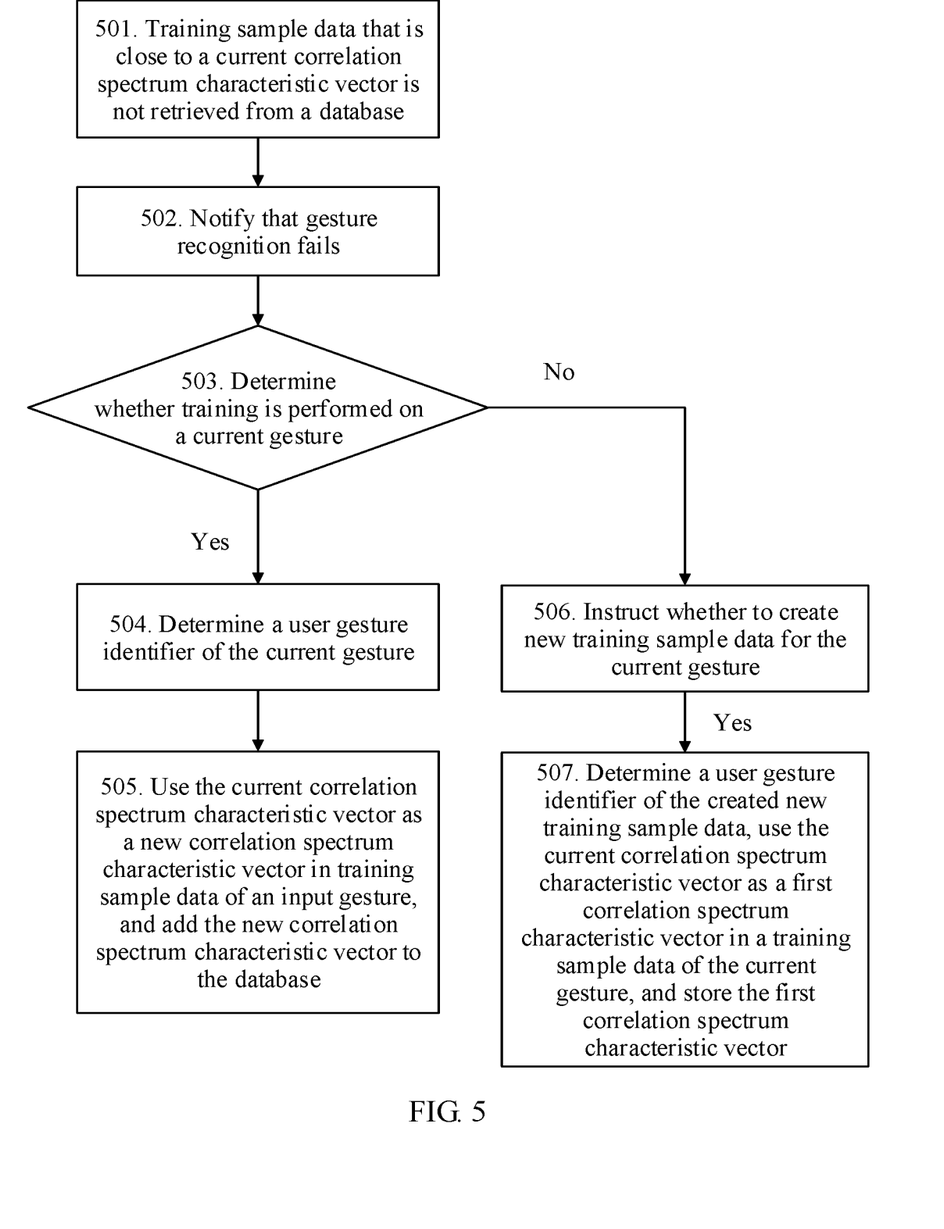
FIG. 5 is a flowchart of processing after recognition fails in a gesture recognition method according to an embodiment of the present invention.

If the user gesture type corresponding to the current correlation spectrum characteristic vector is not found, recognition may fail because of interference from an ambient environment, and recognition may be repeatedly performed. In addition, operations shown in FIG. 5 may be alternatively performed:

Step 501: Determine that a user gesture type corresponding to a current correlation spectrum characteristic vector is not retrieved from a database, and recognition fails.

Step 502: Notify that gesture recognition fails.

Step 503: Determine whether training is performed on a current gesture.

Step 504: If it is determined in step 503 that training is performed on the current gesture, obtain a current user gesture identifier, and perform step 505.

Step 505: Use the current correlation spectrum characteristic vector as a new correlation spectrum characteristic vector in training sample data of an input gesture, and add the new correlation spectrum characteristic vector to the database.

Step 506: If it is determined in step 503 that training is not performed on the current gesture, optionally, instruct whether to create new training sample data for the current gesture, and perform step 507.

Step 507: If it is determined to create the new training sample data, determine a user gesture identifier of the created new training sample data, use the current correlation spectrum characteristic vector as a first correlation spectrum characteristic vector of the current gesture, and store the first correlation spectrum characteristic vector and the user gesture identifier in the database.

In the foregoing manner in Embodiment 1, the terminal device does not need to be complexly improved, other extra hardware does not need to be added to the terminal device. A reflected signal of an uplink sounding reference signal in the prior art is used to perform gesture training and recognition, and training sample data obtained by means of gesture training is stored, and can be used for a gesture recognition operation. Another communication function of the terminal device is not affected during gesture recognition, so that a gesture recognition function of the terminal device is implemented with low costs. In addition, when a reflected signal is being processed, the reflected signal whose reflective distance exceeds the specified distance may be filtered out, so as to reduce interference from an unrelated signal that is not reflected by the gesture, thereby significantly improving gesture recognition accuracy.

Embodiment 2

Embodiment 2 is corresponding to Embodiment 1, and a terminal device and a network device that perform the gesture recognition method in Embodiment 1 are included.

Figure 6:
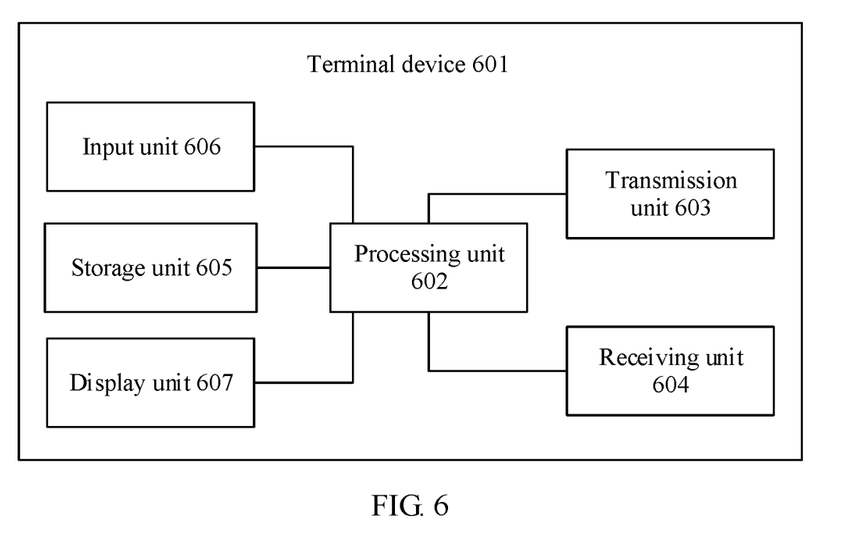
FIG. 6 is a schematic structural diagram of a terminal device according to an embodiment of the present invention.
Figure 7:
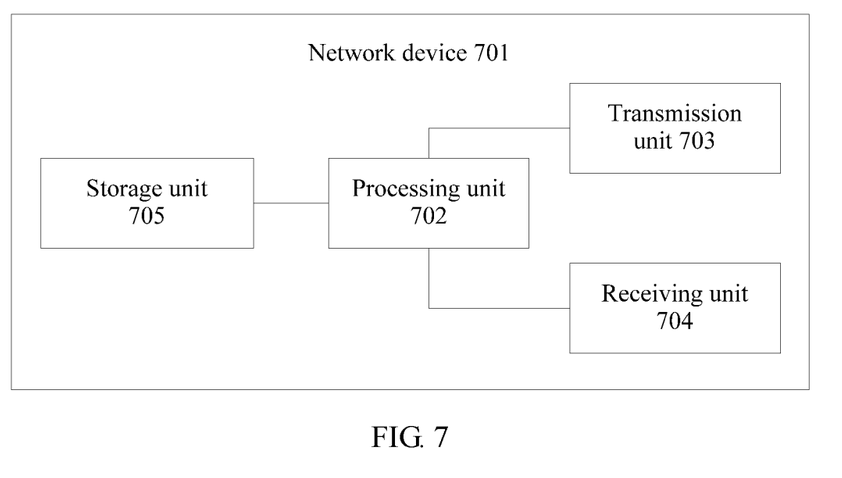
FIG. 7 is a schematic structural diagram of a network device according to an embodiment of the present invention.

With reference to FIG. 6 and FIG. 7, technical solutions in Embodiment 2 of the present invention are described below.

As shown in FIG. 6, a terminal device 601 in this embodiment of this application includes the following components: a processing unit 602, a transmission unit 603, a receiving unit 604, a storage unit 605, an input unit 606, and a display unit 607.

The processing unit 602 is configured to perform a control operation and a mathematical operation of each unit included in the terminal device; the transmission unit 603 is configured to send an electromagnetic wave signal to the terminal device; the receiving unit 604 is configured to receive an electromagnetic wave signal; the storage unit 605 is configured to store files such as data and a program; the input unit 606 is configured to receive information entered by a user of the terminal device; the display unit 607 is configured to display the information to the user of the terminal device.

As shown in FIG. 7, a network device 701 in this embodiment of this application includes a processing unit 702, a transmission unit 703, a receiving unit 704, and a storage unit 705.

A person skilled in the art should understand that the terminal device 601 and the network device 701 should further include another necessary component required for implementing communication functions of the terminal device 601 and the network device 701, such as a power supply unit. However, the foregoing component is independent of the present invention, and is not described in detail herein.

Both an improvement to the prior art in Embodiment 2 and SRS configuration information are the same as those in Embodiment 1, and details are not described herein again.

With reference to FIG. 1, FIG. 6, and FIG. 7, an SRS set configuration process is described below.

The processing unit 702 of the network device 701 generates an SRS set used for gesture recognition. Both content and configuration of the signal set are the same as those in step 101 of Embodiment 1, and details are not described again.

The processing unit 702 of the network device 701 transmits the generated SRS set used for gesture recognition to the transmission unit 703, and the transmission unit 703 sends the SRS set to the terminal device 601.

The receiving unit 604 of the terminal device 601 receives information about the SRS set used for gesture recognition, and transmits the information to the processing unit 602. The processing unit 602 determines, according to the information that is about the SRS set and that is received by the receiving unit 604, an SRS currently used for gesture recognition.

When a user triggers a gesture input function, the processing unit 602 of the terminal device 601 selects an appropriate SRS from the SRS set used for gesture recognition, to perform transmission and recognition. A specific selection method is the same as that in step 103 of Embodiment 1.

In actual application, the storage unit 605 of the terminal device 601 may store the SRS set used for gesture recognition. In this case, the SRS set configuration process may be omitted, and the terminal device 601 does not need to require the network device 701 to generate and configure the SRS set. When the terminal device 601 needs to perform gesture recognition, the terminal device 601 directly selects an SRS from the SRS set that is stored in the storage unit 605 and that is used for gesture recognition, to perform transmission.

In Embodiment 2 of this application, the terminal device 601 may first undergo a training stage, record a graph spectrum characteristic vector of a reflected signal of an SRS from a gesture of the user, use the graph spectrum characteristic vector as training sample data, and store the training sample data in a database.

With reference to FIG. 2, FIG. 6, and FIG. 7, a training process is described below.

The same as step 201 in Embodiment 1, the transmission unit 603 of the terminal device 601 transmits an SRS.

For the SRS sent by the terminal device 601, if an SRS set configuration process of the network device 701 is included, the terminal device 601 selects the SRS from an SRS set sent by the network device 701; or if an SRS set configuration process of the network device 701 is not included, the terminal device 601 selects the SRS from an SRS set that is stored in the storage unit 605 of the terminal device 601 and that is used for gesture recognition.

The same as step 202 in Embodiment 1, a user makes a gesture at a particular distance from the terminal device 601. The user may make the gesture near the terminal device 601, for example, within 30 cm.

The same as step 203 in Embodiment 1, the receiving unit 604 of the terminal device 601 receives a multipath reflected signal of the SRS transmitted by the terminal device 601, and the processing unit 602 performs a related operation on the reflected signal of the SRS and a signal template corresponding to the sent SRS. In Embodiment 2 of this application, a manner of eliminating impact exerted by the SRS sent by the terminal device on detection of the reflected signal of the SRS is the same as step 203 in Embodiment 1, and details are not described herein again.

The same as step 204 in Embodiment 1, the processing unit 602 of the terminal device 601 filters out a reflected signal that is of the SRS and whose reflective distance exceeds a specified distance. In Embodiment 2 of this application, a manner of filtering out a signal is the same as step 204 in Embodiment 1, and details are not described again.

The same as step 205 in Embodiment 1, the processing unit 602 of the terminal device 601 records a correlation spectrum characteristic vector of a reflected signal that is of the SRS and that is obtained after the filtering, uses the correlation spectrum characteristic vector and a corresponding user gesture identifier as training sample data, and stores the training sample data in the storage unit 605. The training sample data may include content the same as that in step 205 in Embodiment 1, and details are not described again.

A storage location of the training sample data may be the storage unit 605 of the terminal device 601, or may be the storage unit of the network device 701. If the training sample data is stored in the network device 701, the processing unit of the terminal device 601 needs to transmit the training sample data to the transmission unit 603, and sends the training sample data to the network device 701. The receiving unit 704 of the network device 701 receives the training sample data, and transmits the training sample data to the processing unit 702, and the processing unit 702 stores the training sample data in the storage unit 705.

Regardless of whether the training sample data is stored in the storage unit 605 of the terminal device 601 or the storage unit 705 of the network device 701, the training sample data may be shared by all terminal devices, and the training sample data may be further processed in a big data analysis manner, so as to improve recognition accuracy.

In Embodiment 2 of this application, after the terminal device 601 undergoes the training stage, the storage unit 605 stores training sample data of each gesture; or training sample data of each gesture is obtained from the storage unit 705 of the network device 701 in a sharing manner; or the training sample data may be pre-stored in the storage unit 605 of the terminal device 601. At a gesture recognition stage, the processing unit 602 of the terminal device 601 compares a correlation spectrum characteristic vector of a user gesture with the correlation spectrum characteristic vector in the training sample data in the storage unit 605, so as to recognize the user gesture.

With reference to FIG. 4, FIG. 6, and FIG. 7, a recognition process is described below.

The same as step 401 in Embodiment 1, the transmission unit of the terminal device 601 transmits an SRS.

The same as step 402 in Embodiment 1, a user makes a gesture at a particular distance from the terminal device 601.

The same as step 403 in Embodiment 1, the receiving unit 604 of the terminal device 601 receives a multipath reflected signal of the SRS transmitted by the terminal device 601, and the processing unit 602 performs a related operation on the reflected signal and a signal template corresponding to the sent SRS.

The same as step 404 in Embodiment 1, the processing unit 602 of the terminal device 601 filters out a reflected signal that is of the SRS and whose reflective distance exceeds a specified distance.

The same as step 405 in Embodiment 1, the processing unit 602 of the terminal device 601 records a correlation spectrum characteristic vector of a reflected signal that is of the SRS and that is obtained after the filtering, and matches the correlation spectrum characteristic vector obtained by means of measurement against training sample data in the storage unit 605, so as to recognize an input gesture. A manner of recognizing an input gesture by the processing unit 602 is the same as step 405 in Embodiment 1, and details are not described again.

If a user gesture type corresponding to a current correlation spectrum characteristic vector is not found, recognition may fail because of interference from an ambient environment, and recognition may be repeatedly performed. In addition, operations described in FIG. 5 may be alternatively performed:

Step 501: The processing unit 602 determines that a user gesture type corresponding to a current correlation spectrum characteristic vector is not retrieved from the storage unit 605, and recognition fails.

Step 502: The processing unit 602 controls the display unit 607 to notify that gesture recognition fails.

Step 503: The processing unit 602 determines, according to input of the input unit 606, whether training is performed on a current gesture.

Step 504: If it is determined in step 503 that training is performed on the current gesture, the processing unit 602 determines a current user gesture identifier according to the input of the input unit 606, and performs step 505.

Step 505: The processing unit 602 uses the current correlation spectrum characteristic vector as a new correlation spectrum characteristic vector in training sample data of an input gesture, and adds the new correlation spectrum characteristic vector to the storage unit 605.

Step 506: If it is determined in step 503 that training is not performed on the current gesture, optionally, the processing unit 602 controls the display unit 607 to instruct whether to create new training sample data for the current gesture, and performs step 507.

Step 507: If the processing unit 602 determines, according to the input of the input unit 606, to create the new training sample data, the processing unit 602 determines a user gesture identifier of the created new training sample data according to the input of the input unit 606, uses the current correlation spectrum characteristic vector as a first correlation spectrum characteristic vector of the current gesture, and stores the first correlation spectrum characteristic vector and the user gesture identifier in the storage unit 605.

Beneficial technical effects obtained in Embodiment 2 are the same as those in Embodiment 1, and details are not described again.

In the embodiments of this application, although the technical solutions are described by using user gesture recognition as an example, a person skilled in the art should know that the technical solutions in the embodiments of this application are not used to recognize only a user gesture, and may be used to recognize a shape or an action of another apparatus.

Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the embodiments provided in this application, it should be understood that the disclosed system, apparatus, and method may be implemented in another manner, and for different embodiments, specific implementations may be combined when no conflict occurs. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

What is claimed is:

1. A gesture recognition method, applied to a terminal device for transmitting a mobile communications network signal, wherein the method comprises:
    transmitting, by the terminal device, a first sounding reference signal (SRS) and a second SRS to a same gesture-making object, wherein the terminal device stores training sample data that comprises correlation spectrum characteristic vectors of reflected signals of SRSs and, gesture identifiers corresponding to the correlation spectrum characteristic vectors;
    receiving, by the terminal device, a first multipath reflected signal that is of the first SRS and that is reflected from the gesture-making object, and performing a first related operation on the first multipath reflected signal and a signal template corresponding to the first SRS, to obtain a first correlation spectrum characteristic vector of the first multipath reflected signal;
    matching, by the terminal device, the first correlation spectrum characteristic vector against the training sample data, to recognize a gesture input by the gesture-making object;
    generating a second correlation spectrum characteristics vector of the second SRS by a second related operation, wherein the second related operations is performed on a second multipath reflected signal from the gesture-making object and a signal template corresponding to the second SRS;
    adding the second correlation spectrum characteristics vector and a corresponding gesture identifier to the training sample data stored in the terminal device.

2. The method according to claim 1, wherein
the training sample data is pre-stored in the terminal device; or
the training sample data is obtained from a network device by the terminal device.

3. The method according to claim 2, further comprising:
sending the second correlation spectrum characteristics vector and the corresponding gesture identifier to a network device.

4. The method according to claim 1, wherein
the first related operation comprises:
filtering out a reflected signal, wherein a distance between the reflected signal and the terminal device exceeds a specified distance when reflection occurs.

5. The method according to claim 1, wherein the method further comprises:
    determining, by the terminal device according to an SRS set pre-stored in the terminal device, an SRS used for gesture recognition; or
    receiving, by the terminal device, information that is about an SRS set and that is sent by the network device; and
    determining, by the terminal device according to the received information about the SRS set, an SRS used for gesture recognition.

6. The method according to claim 5, wherein
the SRS set comprises a parameter value section corresponding to at least one SRS, and the parameter value section comprises any one or more of the following: a transmit interval, a transmit bandwidth, a transmit carrier frequency, or a transmit power of the SRS; or the SRS set comprises a parameter value corresponding to at least one SRS, and the parameter value belongs to a parameter value section.

7. The method according to claim 6, wherein
the parameter value section corresponding to the SRS comprises any one or more of the following: the transmit interval is less than or equal to 10 milliseconds; the transmit bandwidth is greater than or equal to 100 MHz; the transmit carrier frequency is greater than or equal to 10 GHz; or the transmit power is less than or equal to 0 dBm.

8. A terminal device, applied to a mobile communications system, wherein the terminal device comprises
a storage;
a transmitter;
a receiver; and
a processor;
wherein the storage is configured to store a database, wherein the database stores training sample data that comprises correlation spectrum characteristic vectors of reflected signal of sounding reference signals (SRSs) and gesture identifiers corresponding to the correlation spectrum characteristic vectors;
wherein the transmitter is configured to transmit a first SRS and a second SRS to same gesture-making object, wherein the first SRS is determined by the processor and that is used for gesture recognition, and wherein the second SRS is determined by the processor and is used for training data collection;
wherein the receiver is configured to receive a first multipath reflected signal that is of the first SRS and that is reflected from the gesture-making object;
wherein the processor is configured to:
determine the first SRS used for gesture recognition, and perform a first related operation on the first multipath reflected signal received by the receiver and a signal template corresponding to the first SRS, to obtain a first correlation spectrum characteristic vector of the first multipath reflected signal;
match the first correlation spectrum characteristic vector against the training sample data in the database, to recognize a gesture input by the gesture-making object;
generate a second correlation spectrum characteristics vector of the second SRS by a second related operation, wherein the second related operations is performed on a second multipath reflected signal from the gesture-making object and a signal template corresponding to the second SRS; and
adding the second correlation spectrum characteristics vector and a corresponding gesture identifier to the training sample data stored in the terminal device.

9. The terminal device according to claim 8, wherein
the training sample data is pre-stored in the storage; or
the training sample data is obtained from a network device by the terminal device by using the receiver, and is stored in the database of the storage.

10. The terminal device according to claim 9, wherein
the transmitter further sends the training sample data to the network device.

11. The terminal device according to claim 8, wherein the first related operation comprises:
filtering out a reflected signal, wherein a distance between the reflected signal and the terminal device exceeds a specified distance when reflection occurs.

12. The terminal device according to claim 8, wherein
the storage pre-stores an SRS set; and
the processor determines, according to the SRS set, an SRS used for gesture recognition; or
the receiver receives information that is about an SRS set and that is sent by the network device; and
the processor determines, according to the information that is about the SRS set and that is received by the receiver, an SRS used for gesture recognition.

13. The terminal device according to claim 12, wherein
the SRS set comprises a parameter value section corresponding to at least one SRS, and the parameter value section comprises any one or more of the following: a transmit interval, a transmit bandwidth, a transmit carrier frequency, or a transmit power of the SRS; or
the SRS set comprises a parameter value corresponding to at least one SRS, and the parameter value belongs to a parameter value section.

14. The terminal device according to claim 13, wherein
the parameter value section corresponding to the SRS comprises any one or more of the following: the transmit interval is less than or equal to 10 milliseconds; the transmit bandwidth is greater than or equal to 100 MHz; the transmit carrier frequency is greater than or equal to 10 GHz; or the transmit power is less than or equal to 0 dBm.

* * * * *